United States Patent
Baltersee et al.

(10) Patent No.: US 7,333,532 B2
(45) Date of Patent: Feb. 19, 2008

(54) ADAPTIVE CODE-TRACKING RECEIVER FOR DIRECT-SEQUENCE CODE-DIVISION MULTIPLE ACCESS (CDMA) COMMUNICATIONS OVER MULTIPATH FADING CHANNELS AND METHOD FOR SIGNAL PROCESSING IN A RAKE RECEIVER

(75) Inventors: Jens Baltersee, Cologne (DE); Gunnar Fock, Aachen (DE); Peter Schulz-Rittich, Aachen (DE)

(73) Assignee: Agere Systems Inc., Allentown, PA (US)

( * ) Notice: Subject to any disclaimer, the term of this patent is extended or adjusted under 35 U.S.C. 154(b) by 223 days.

(21) Appl. No.: 11/315,534

(22) Filed: Dec. 22, 2005

(65) Prior Publication Data

US 2006/0098719 A1 May 11, 2006

Related U.S. Application Data

(63) Continuation of application No. 09/758,302, filed on Jan. 11, 2001, now Pat. No. 7,142,585.

(30) Foreign Application Priority Data

Jan. 14, 2000  (EP)  .................................. 00300268

(51) Int. Cl.
*H04B 1/00* (2006.01)
(52) U.S. Cl. ...................................... 375/148; 375/150
(58) Field of Classification Search ................ 375/130, 375/140, 142, 144, 148, 150; 370/335, 342, 370/441
See application file for complete search history.

(56) References Cited

U.S. PATENT DOCUMENTS 5,361,276 A    11/1994 Subramanian .................. 375/1

(Continued)

FOREIGN PATENT DOCUMENTS

| | | |
|---|---|---|
| EP | 0 849 887 A2 | 12/1997 |
| EP | 0 993 127 A1 | 10/1999 |
| EP | 1-117-185 A1 * | 7/2001 |
| EP | 1-117-186 A1 * | 7/2001 |
| WO | WO 95/34140 | 12/1995 |
| WO | WO 00/21209 | 4/2000 |

OTHER PUBLICATIONS

Baltersee et al., "Channel Tracking Rake Receiver in Closely Spaced Multipath Environments," IEEE Journal on Selected Area in Communication vol. 19, No. 12, Dec. 2001, pp. 2420-2431.*

(Continued)

*Primary Examiner*—Tesfaldet Bocure
(74) *Attorney, Agent, or Firm*—Steve Mendelsohn

(57) ABSTRACT

In one embodiment, a rake receiver for a spread-spectrum (SS) signal has a plurality of rake fingers corresponding to different multipath components of the SS signal and sampling circuitry generating a stream of samples corresponding to the SS signal. A first rake finger has a detection path detecting symbols based on the samples, a synchronization (synch) path, and a weighting controller. Front-end circuitry in the synch path applies three or more time delays, weighting, and SS correlation to the stream of samples to generate front-end output signals. Back-end circuitry in the synch path generates one or more control signals for controlling the timing of the sampling circuitry based on the front-end output signals. The weighting controller adaptively controls the weighting applied by the front-end synch circuitry to minimize effects of one or more other multipath components associated with one or more other rake fingers of the rake receiver.

19 Claims, 14 Drawing Sheets

U.S. PATENT DOCUMENTS

| | | | |
|---|---|---|---|
| 5,463,660 A | 10/1995 | Fukasawa et al. | 375/205 |
| 5,719,899 A | 2/1998 | Thielecke et al. | 375/206 |
| 5,790,588 A | 8/1998 | Fukawa et al. | 375/200 |
| 5,828,705 A | 10/1998 | Kroeger et al. | 375/326 |
| 5,978,423 A | 11/1999 | Farjh | 375/347 |
| 5,987,014 A | 11/1999 | Magill et al. | 370/335 |
| 6,034,986 A | 3/2000 | Yellin | 375/200 |
| 6,137,788 A | 10/2000 | Sawahashi et al. | 370/342 |
| 6,154,443 A | 11/2000 | Huang et al. | 370/210 |
| 6,175,587 B1 | 1/2001 | Madhow et al. | 375/148 |
| 6,215,814 B1 | 4/2001 | Ylitalo et al. | 375/148 |
| 6,269,075 B1 | 7/2001 | Tran | 370/206 |
| 6,272,189 B1 | 8/2001 | Garin et al. | 375/343 |
| 6,456,648 B1 | 9/2002 | Bultan et al. | 375/148 |
| 6,456,653 B1 | 9/2002 | Sayeed | 375/227 |
| 6,473,415 B1 | 10/2002 | Kim et al. | 370/342 |
| 6,480,526 B1 | 11/2002 | Shoki et al. | 375/147 |
| 6,532,254 B1 | 3/2003 | Jokinen | 375/148 |
| 6,535,549 B1 | 3/2003 | Scott et al. | 375/219 |
| 6,567,482 B1 | 5/2003 | Popovic | 375/343 |
| 6,570,909 B1 | 5/2003 | Kansakoski et al. | 375/148 |
| 6,570,918 B1 | 5/2003 | Rademacher | 375/232 |
| 6,600,729 B1 | 7/2003 | Suzuki | 370/335 |
| 6,633,553 B1 | 10/2003 | Hwang | 370/329 |
| 6,661,835 B1 | 12/2003 | Sugimoto et al. | 375/148 |
| 6,683,924 B1 | 1/2004 | Ottosson et al. | 375/343 |
| 6,707,844 B1 | 3/2004 | Imaizumi et al. | 375/148 |
| 6,714,585 B1 | 3/2004 | Wang et al. | 375/148 |
| 6,747,969 B1 | 6/2004 | Hirsch | 370/342 |
| 6,757,346 B2 | 6/2004 | Saito et al. | 375/349 |
| 6,768,727 B1 | 7/2004 | Sourour et al. | 370/335 |
| 6,785,323 B1 | 8/2004 | Proctor, Jr. | 375/146 |
| 6,798,737 B1 | 9/2004 | Dabak et al. | 370/209 |
| 6,865,218 B1 | 3/2005 | Sourour | 375/148 |
| 2001/0028677 A1 | 10/2001 | Wang et al. | 375/148 |
| 2002/0034218 A1 | 3/2002 | Papasakellariou et al. | 375/148 |
| 2002/0044592 A1 | 4/2002 | Razzell | 375/148 |
| 2002/0051486 A1 | 5/2002 | Aue | 375/150 |
| 2002/0131479 A1 | 9/2002 | Butler et al. | 375/147 |
| 2003/0091104 A1 | 5/2003 | Yellin | 375/148 |
| 2003/0193914 A1 | 10/2003 | Lomp et al. | 370/335 |
| 2004/0153679 A1* | 8/2004 | Fitton et al. | 713/322 |
| 2005/0069025 A1* | 3/2005 | Kimura | 375/152 |
| 2005/0265430 A1 | 12/2005 | Ozluturk et al. | 375/145 |

OTHER PUBLICATIONS

Vijay K. Garg, "*IS-95 CDMA and CDMA 2000,*" Prentice Hall PTR, 2000, pp. 60-70.

W. Sheen, et al., "*A Noncoherent Tracking Loop With Diversity and Multipath Interference Cancellation for Direct-Sequence Spread-Spectrum Systems,*" IEEE Transactions on Communications, Nov. 1998, vol. 46, No. 11, pp. 1516-1524.

H. Huang, et al., "*Improving Detection and Estimation in Pilot-Aided Frequency Selective CDMA Channel,*" IEEE 6th International Conference on Universal Person Communications, 1997, vol. 1, pp. 198-201.

\* cited by examiner

ADAPTIVE CODE-TRACKING RECEIVER FOR DIRECT-SEQUENCE CODE-DIVISION MULTIPLE ACCESS (CDMA) COMMUNICATIONS OVER MULTIPATH FADING CHANNELS AND METHOD FOR SIGNAL PROCESSING IN A RAKE RECEIVER

CROSS-REFERENCE TO RELATED APPLICATION

This is a continuation of application Ser. No. 09/758,302, filed on Jan. 11, 2001 now issued as U.S. Pat. No. 7,142,585 on Dec. 28, 2006 the teachings of which are incorporated herein by reference.

DESCRIPTION

1. Field of the Invention

The invention is directed to a method of signal processing in a rake receiver and to a direct-sequence code division multiple access (DS-CDMA) receiver in general and especially to a direct-sequence code division multiple access (DS-CDMA) receiver for mobile cellular communications.

2. Prior Art

Spread-spectrum communications systems have been used for many decades, at first because of the excellent anti-jamming properties, but lately because of several advantages in multiple-access scenarios such as cellular communications. In a spread-spectrum system, pseudo-noise code signals (PN code) are used to modulate the data signal, where the bandwidth of the former is substantially larger than that of the latter. The PN code can be used to modulate the carrier frequency, called frequency-hopped spread spectrum (FH), or it can be multiplied directly with the information signal, called direct-sequence spread-spectrum (DS). The resulting signal then has a bandwidth far broader than that of the original data signal.

In the following, only DS-spread-spectrum signals and systems are addressed in the prior art discussion. One field of applications for such systems is e.g. mobile cellular communications. Recent worldwide standardization efforts defined DS-spread-spectrum as the transmission method of choice for third-generation mobile telecommunication systems. Orthogonal PN-codes are assigned to different users transmitting simultaneously in the same frequency band, enabling receivers to detect and decode their users' signal despite interference from other users. Other impairments in the mobile environment include the fading multipath channel and Doppler frequency shift due to mobile motion.

Presently employed spread-spectrum receivers gather as much of the transmitted signal energy as possible in order to maximize the signal-to-noise ratio. In order to do so, the received signal is synchronously correlated with the known PN-code to yield the original information signal. In multipath fading channels however, the signal energy is dispersed over a certain amount of time due to distinct echo paths and scattering. One crucial task of the receiver is thus to estimate the channel to improve its performance. In realizable digital communication receivers, the principle of Synchronized detection is employed, see f.i. Heinrich Meyr, Marc Moeneclacy and Stefan Fechtel in "Digital Communication Receivers: Synchronization, Channel Estimation and Signal Processing", John Wiley and Sons, New York, 1998, meaning that estimates for channel parameters are computed and used in the detection process as if they were the true values. This generally results in a small loss in performance compared to the case where one has perfect knowledge about the channel, but that loss becomes negligible if the data after channel decoding are compared. If the receiver has information about the channel profile, one way of gathering signal energy is then to assign several correlator branches to different echo paths and combine their outputs constructively, a structure known as the rake receiver.

The rake receiver has several fingers, one for each echo path, and in each finger, the path delay with respect to some reference delay such as a direct or the earliest received path, must be estimated and tracked throughout the transmission. The tracking unit generates estimates for the delays of several multipath components by means of an early-late timing error detector and utilizes these estimates for the different delays either to shift the phase of the pseudonoise-code (PN-code), or to compute intermediate samples of the data signal at the estimated timing instants.

However, tracking of such delays in general suffers from interference from the other paths and becomes troublesome and difficult, especially when echo paths lie close together, meaning that their arrival times at the receiver differ by values in the order of the chip duration $T_c$, being the inverse of the PN-code signal bandwidth.

Several algorithms have been proposed in the past for tracking of the multipath delays. All of these algorithms suffer from either high sensitivity to multipath fading and thus reduced performance in such environments, or implementation complexity which is prohibitive for the use in mobile terminals where size, production costs and power consumption are critical issues. One example of the former is the so-called early-late gate timing error detector (EL-TED), being a natural solution to a mathematical optimization problem for nondispersive, additive white Gaussian noise channels (AWGN) (see Heinrich Meyr, Marc Moeneclacy and Stefan Fechtel in "Digital Communication Receivers: Synchronization, Channel Estimation and Signal Processing", John Wiley and Sons, New York, 1998, Heinrich Meyr and Gerd Ascheid in "Synchronization in Digital Communications", vol. 1, John Wiley & Sons, New York, 1990 and A. J. Viterbi in "CDMA—Principles of Spread Spectrum Communication", Addison-Wesley Publishing Company, Reading (Mass.), 1995).

A prior art early-late gate timing error detector usually is able to track echo path delay as long as the relative delay between two paths is larger than some threshold. However, if the relative delay is smaller than a certain threshold value, the early-late gate timing error detector is not apt to longer distinguish the two paths. Furthermore, tracking of weaker paths (lower power) can be disturbed by stronger paths with a relative delay larger than the aforementioned threshold. For an example of an algorithm with significantly higher implementation complexity than the early-late gate timing error detector, see R. A. Iltis, "An EKF-Based Joint Estimator for Interference, Multipath, and Code Delay in a DS Spread-Spectrum Receiver", IEEE Transactions on Communications, Vol. 42, No. 2/3/4, February-April 1994.

Especially in indoor mobile communication scenarios, the path delay of the last identifiable echo path is small compared to outdoor scenarios. All of the signal energy is dispersed around the path with the shortest delay and a sufficient echo path resolution is critical for adequate receiver performance, expressed for instance as the bit-error rate (BER). None of the existing early-late gate timing error detector algorithms with reasonable complexity is able to track adjacent path delays which are separated by less than the mentioned threshold. With such a tracking system, the required signal-to-noise ratio to achieve a certain BER is reduced significantly.

Consequently, it is an object of the invention to provide a direct-sequence code division multiple access (DS-CDMA) receiver and a method for signal processing in a rake receiver having an improved tracking performance, especially in cases where delay differences of arriving signal components of multipath signals are in the order of the chip duration.

According to the invention and in order to significantly reduce the effect of multipath disturbance on the timing error detector, several early and late correlators are used and their outputs are adaptively weighted.

The timing error detector can be coherent or noncoherent—in the former case, the adaptive weighting of correlators is identical to pre-filtering the spread-spectrum signal with an adaptive finite impulse response (FIR) filter, followed by only one correlator. In the noncoherent case, two adaptive filters and two correlators are required.

The invention is described below in more detail and with reference to the appended drawings in view of most preferred embodiments.

DETAILED DESCRIPTION OF THE INVENTION

The invention is explained in more detail and in view of preferred embodiments below where like numerals are designating similar elements in different embodiments of the invention.

Figure 1:
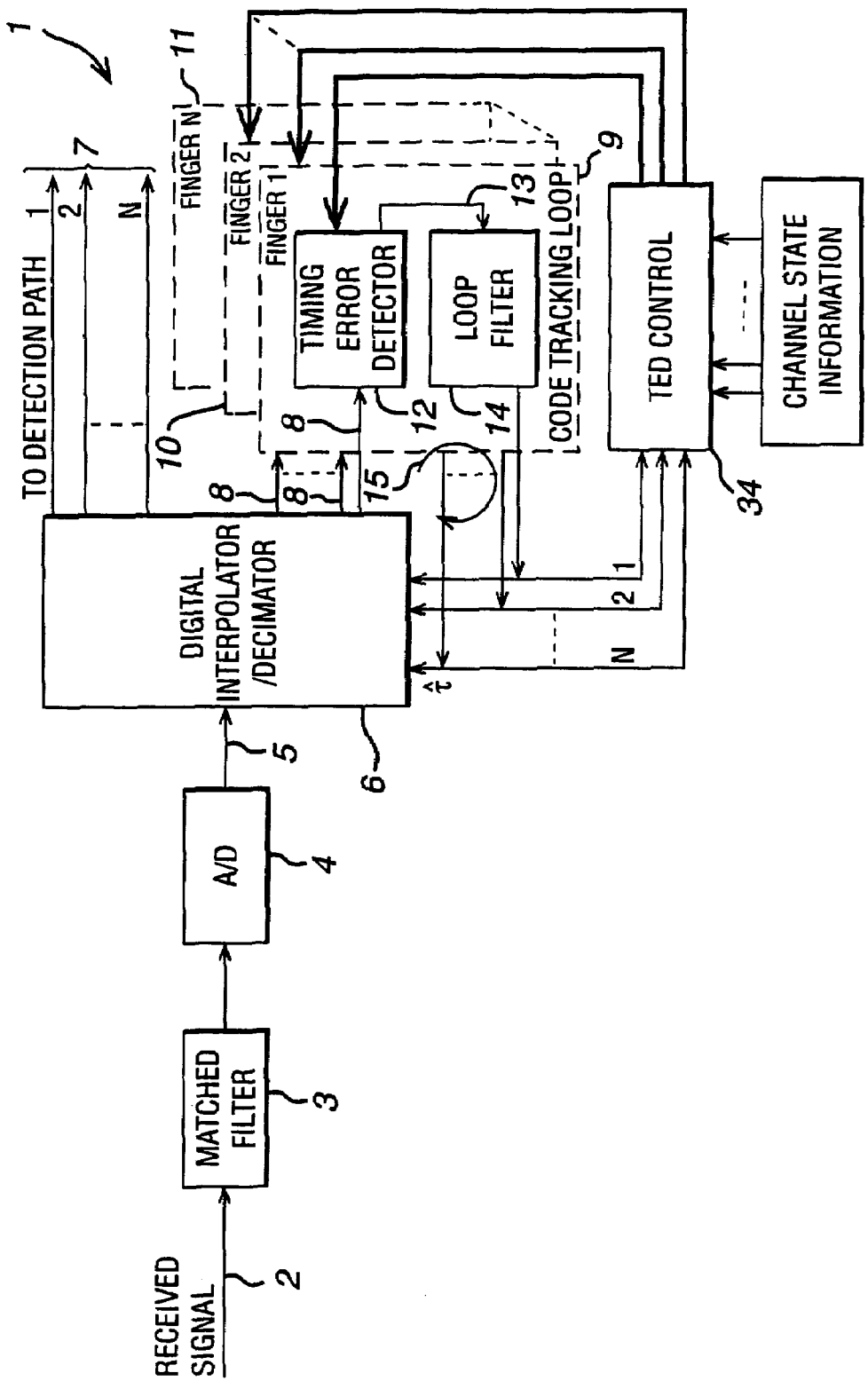
FIG. 1 shows the general structure of a digital code-tracking loop for each finger in a rake receiver for DS-spread-spectrum communications.
Figure 16:
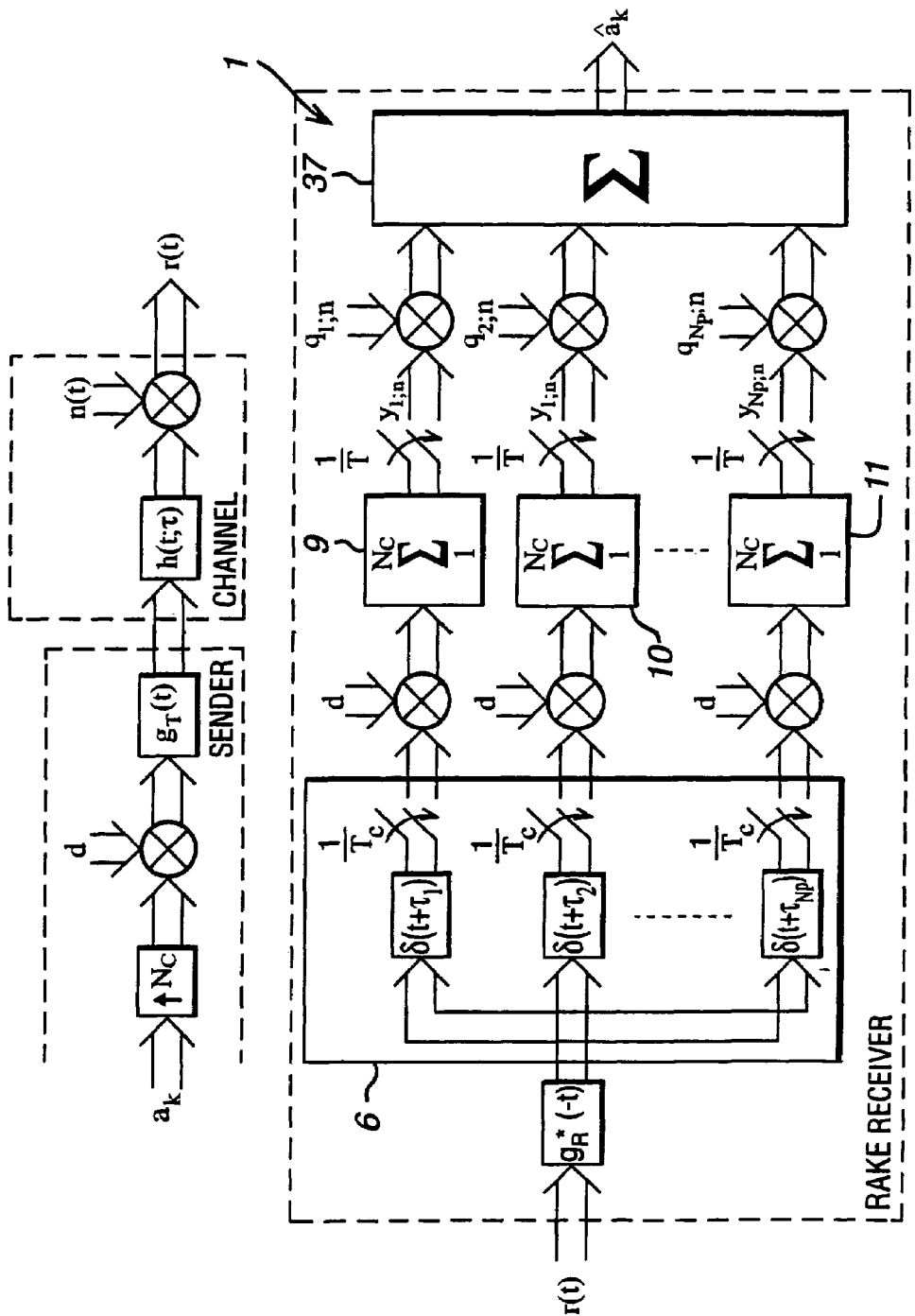
FIG. 16 shows the detection path of a rake receiver model for a detailed theoretical discussion thereof.
Figure 17:
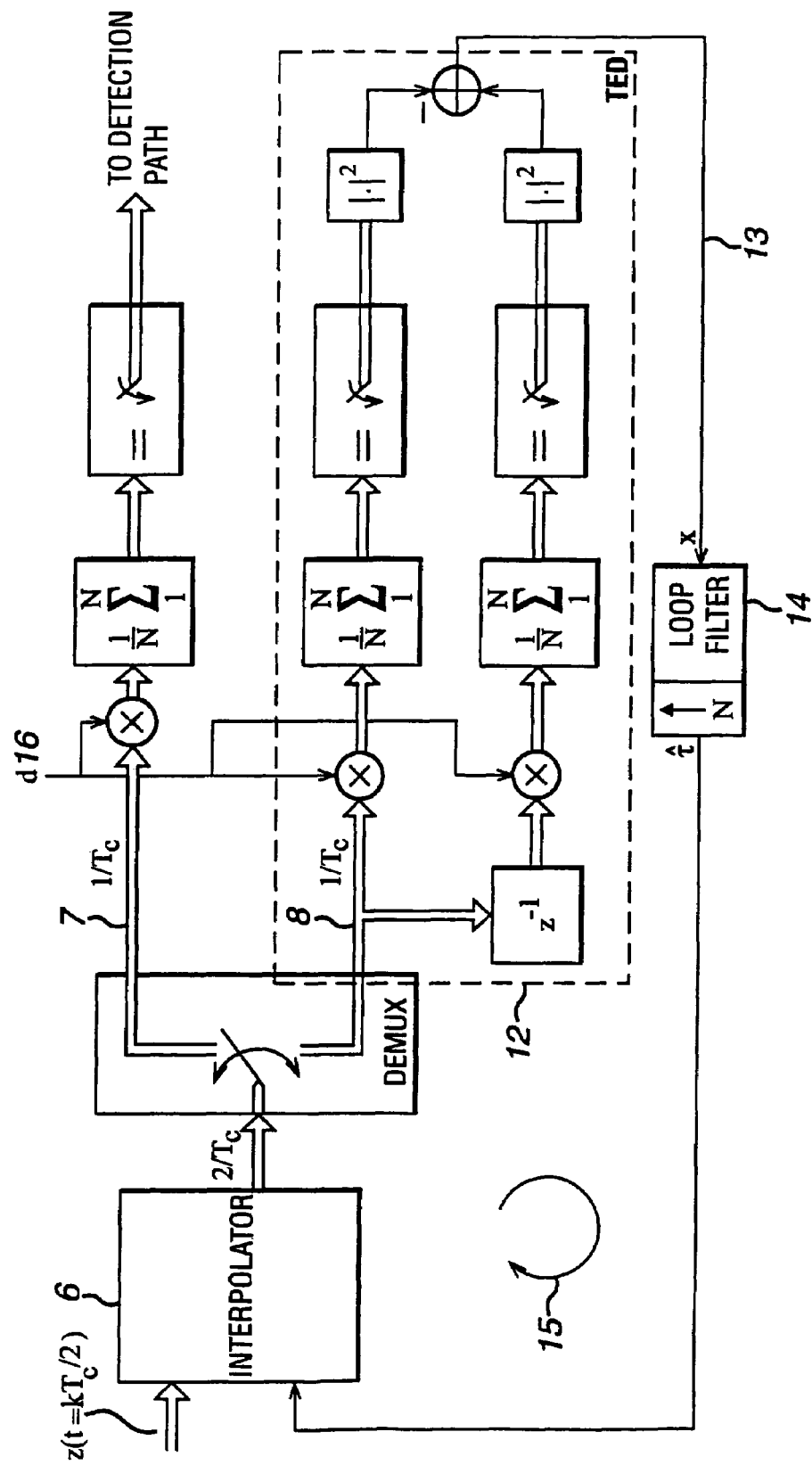
FIG. 17 a noncoherent delay locked loop model for a detailed theoretical discussion thereof.
Figure 18:
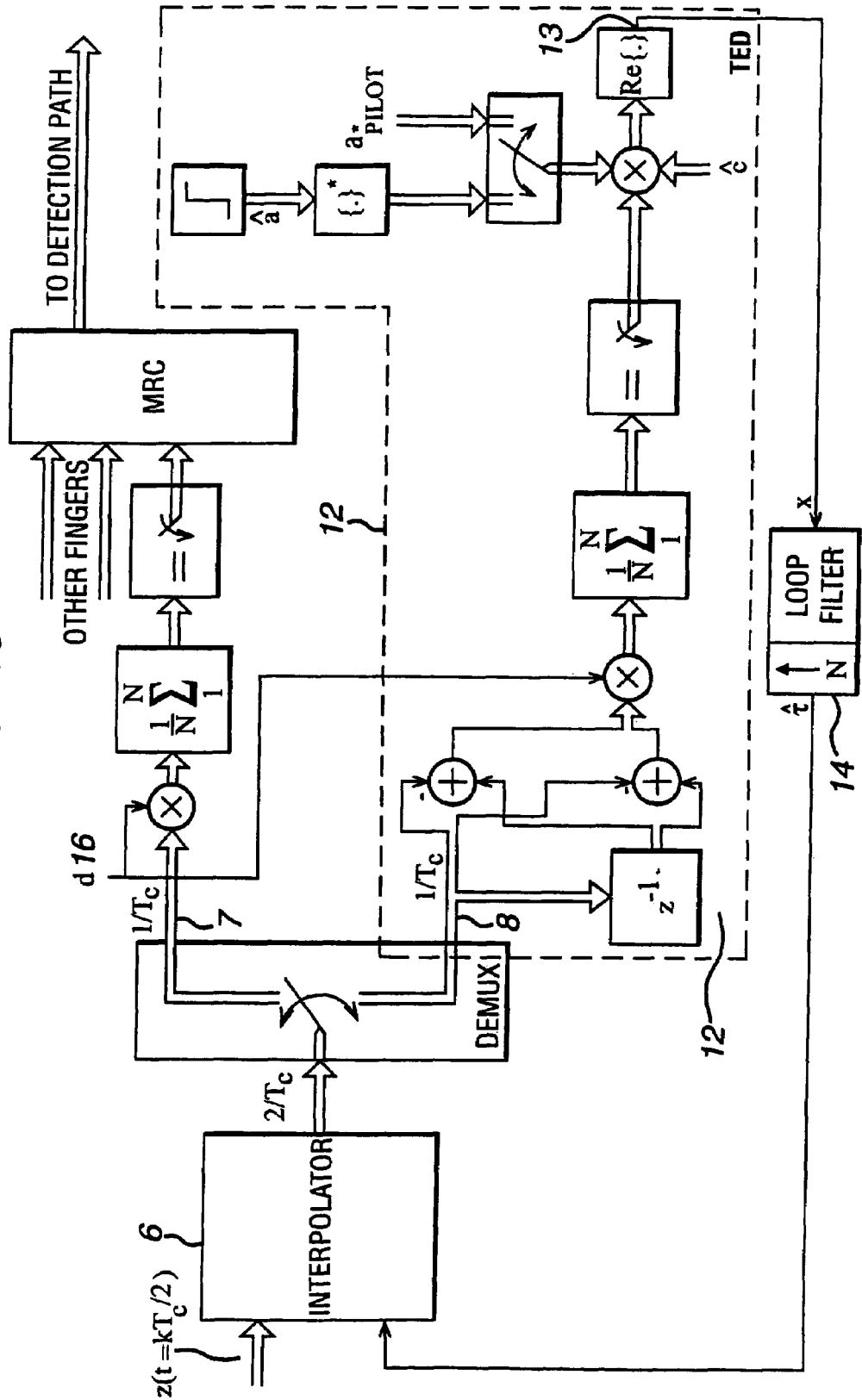
FIG. 18 a coherent delay locked loop model for a detailed theoretical discussion thereof.

The invention is part of a tracking device for a digital spread-spectrum rake receiver 1 as shown in FIGS. 1 and 16.

The incoming signal 2 is fed through a pulse matched filter 3, matched to the transmission pulse. An analog-to-digital (A/D) converter 4 generates equidistant samples 5 of the pulse matched filtered signal and feeds them to a digital interpolator/decimator 6, which generates intermediate samples 7, 8 of the same signal at the estimated timing instants $\hat{\tau}$ for each of the N rake fingers 9, 10, 11.

The interpolated signal is fed to the detection path 7, where the correlation with the PN-code 16 and symbol detection takes place in each finger 9, 10, 11 as shown in more detail FIG. 16 where essentially only the detection path 7 is shown.

Furthermore, the signal 8 is fed to several timing error detectors 12 which generate error signals 13 that are proportional to the remaining path delay error in the signal of the respective Rake finger 9, 10, 11. These error signals are lowpass-filtered in the loop filter to yield estimates for the respective path delay, again for each rake finger 9, 10, 11, which are then fed back to the interpolator/decimator 6, closing the tracking loop 15. The timing error detector 12 is modified adaptively for each finger 9, 10, 11, using channel state information such as the powers, the signal-to-noise ratios and the delays of all paths assigned to the respective rake fingers 9, 10, 11. It is noted that instead of interpolating and decimating the data signal for each rake finger 9, 10, 11, the PN-code can just as well be shifted in order to guarantee the correct alignment between data samples and PN-code samples.

Furthermore, due to normally very slowly varying path delays, delay tracking of all fingers 9, 10, 11 can be implemented in time-sharing using only one dedicated tracking structure.

Conventional Timing Error Detectors

Figure 2:
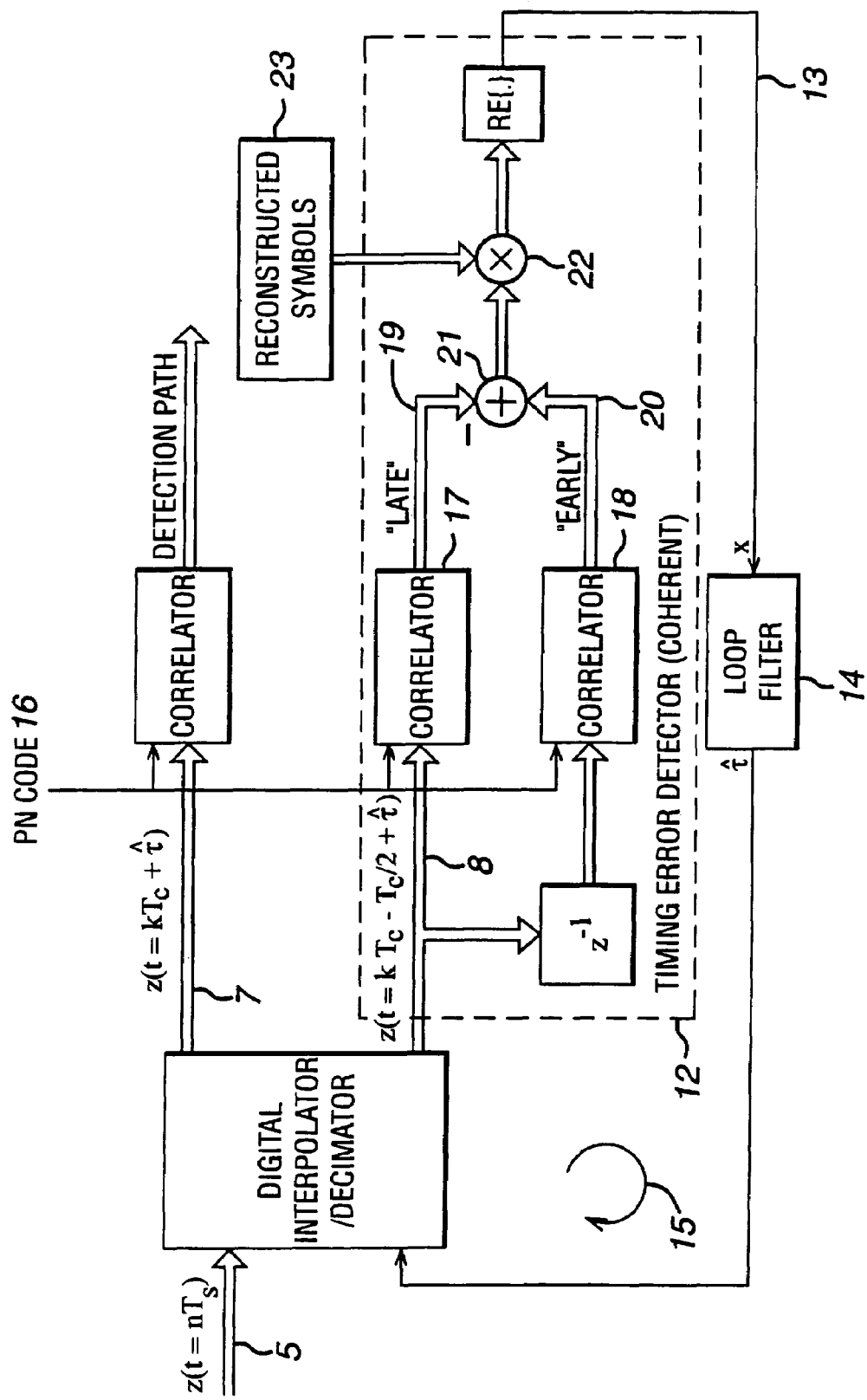
FIG. 2 shows the conventional coherent early-late gate timing error detector, embedded in a code-tracking loop for one finger in a rake receiver.
Figure 3:
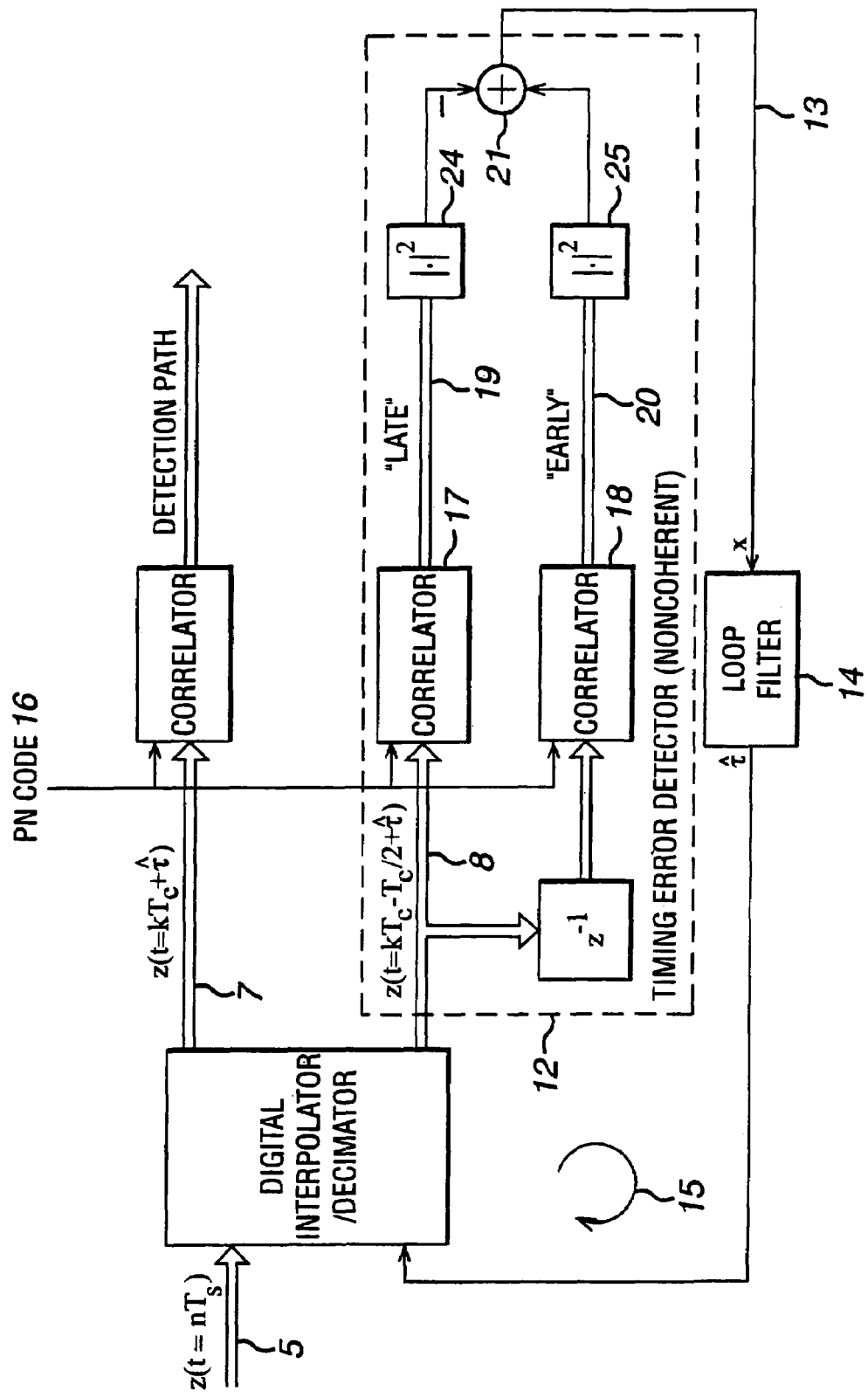
FIG. 3 shows the conventional noncoherent early-late gate timing error detector, embedded in a code-tracking loop for one finger.

Conventional early-late timing error detectors are depicted in FIGS. 2 and 3 in the coherent and noncoherent versions, respectively. The structure downstream of the digital interpolator/decimator 6 is replicated for each rake finger 9, 10, 11, whereas the interpolator/decimator 6 is used jointly. The samples 5 of the incoming signal 2 $z(t=nT_s)$ with $T_s$ being the time interval between two samples are interpolated and decimated at the estimated timing delay $\hat{\tau}$ for each finger 9, 10, 11. Two data streams 7, 8 are generated, one is fed to the detection path 7 and the other 8 is fed to the synchronization path 15. There, the samples and a shifted version thereof, spaced $\pm T_c/2$ with respect to the samples in the detection path, are correlated in a correlator 17, 18 with the PN-code, yielding early 20 and late 19 estimates of the transmitted symbols.

In the coherent case as shown in FIG. 2, early 20 and late 19 estimates, are subtracted by a subtraction unit 21 and multiplied by a multiplier 22 with reconstructed transmitted symbols 23.

The reconstructed symbols 23 can be generated by complex conjugately multiplying symbol decisions or pilot symbols with estimates of the channel phase or the channel phasor. The real part of the resulting samples, now on symbol rate 1/T, is then the error signal x, 13 and is fed through loop filter 14 with lowpass characteristic to yield the estimate for the timing delay $\hat{\tau}$.

In the nonconerent case as shown in FIG. 3, the square of the absolute value of early and late symbols is computed by absolute squaring elements 24, 25 and subtracted to yield the error signal x, 13. For references, see also A. Wilde in "Extended tracking range delay-locked loop", Proceedings of the International Conference on Communications, Seattle, USA, 1995 and Volker Aue and Gerhard P. Fettweis in "A Non-Coherent Tracking Scheme for the RAKE Receiver That Can Cope With Unresolvable Multipath", Proceedings of the International Conference on Communications, Vancouver, Canada, 1999.

The Inventive Adaptive Timing Error Detector Concept

Figure 4:
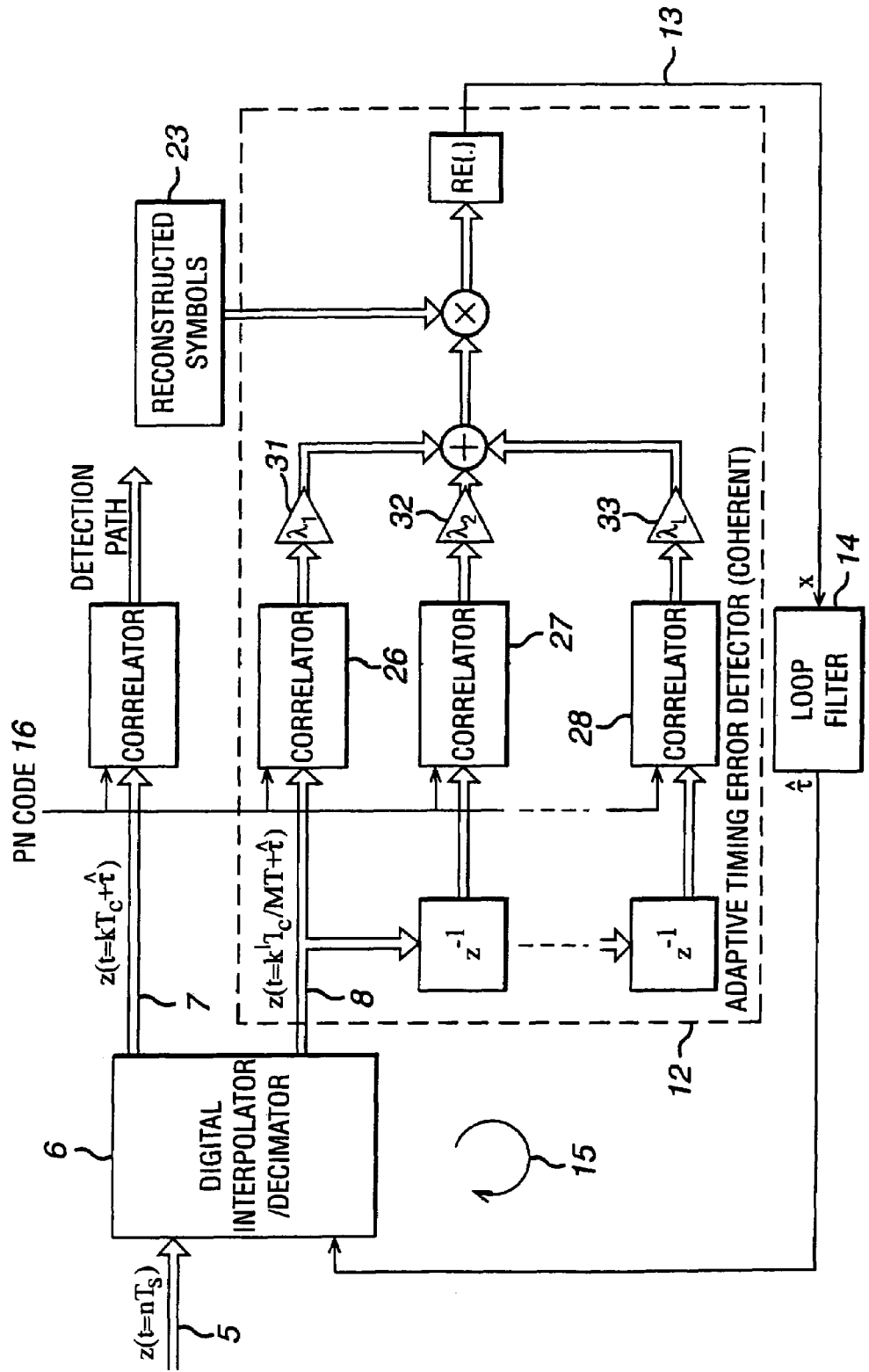
FIG. 4 illustrates the concept of adaptively weighting several early and late correlator branches within the timing error detector.

The concept of the new adaptive timing error detector is depicted in FIG. 4 for the coherent case. Instead of using one early and one late correlator 17, 18, several early and late correlators 26, 27, 28 are employed. The digital interpolator/decimator 6 again feeds the correct samples at rate $1/T_c$ to the detection path 7. The synchronization path 8 is fed with samples at rate $M/T_c$.

The shifted versions thereof in the following branches of correlators 26, 27, 28 may be aligned symmetrically in an early-late fashion with respect to the detection path 7, as in the conventional case, or alternatively shifted in the causal or noncausal direction.

In either case the samples in each branch 7, 8 are correlated with the PN-code 16 and adaptively weighted such as to minimize the effect of other multipaths tracked in the rake receiver 1.

For M=1, $\lambda_1=-1$, $\lambda_2=1$, this inventive embodiment reduces to the conventional timing error detector. The signal processing after summation of all branches of correlators 26, 27, 28 is identical to the conventional timing error detector, both in the coherent and the noncoherent case.

A structure with more than two correlators in an early-late delay tracking loop was presented in "Extended tracking range delay-locked loop", Proceedings of the International Conference on Communications, Seattle, USA, 1995. However, there the weights of the different correlator branches were solely chosen so as to maximize the tracking range of the loop. No effort was made to adaptively combat interference from adjacent paths and their respective rake fingers.

The idea of pre-filtering the spread-spectrum signal was addressed by R. Sampaio-Neto and R. A. Scholtz in "Pre-correlation Filter Design for Spread-Spectrum Code Tracking in Interference", IEEE Journal on Selected Areas in Communications, Vol. SAC-3, No. 5, September 1985. There, however, fixed pre-correlation filters were employed in an analog system and no effort was made to specifically and adaptively combat multipath interference.

Figure 5:
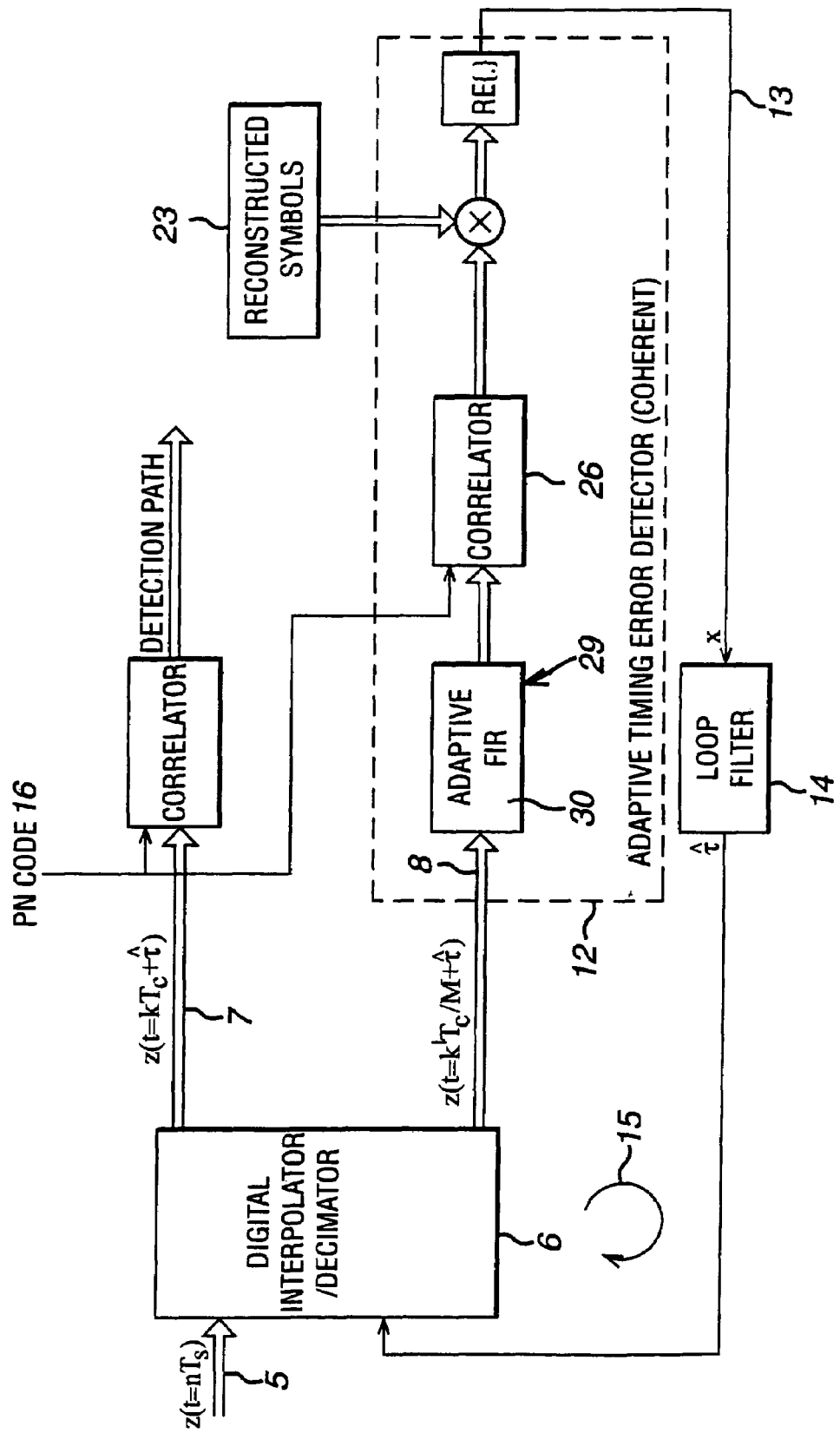
FIG. 5 shows a coherent implementation of the new adaptive early-late gate timing error detector, using one adaptive FIR filter in the synchronization path

For the inventive coherent timing error detector, the adaptive weighting of several correlation branches corresponds to the adaptive finite impulse response (FIR) filtering model in FIG. 5.

Due to the linearity of the correlation operation, the weighting and summation can be performed prior to correlating with the PN-code 16, yielding a much simplified structure with only one correlator and one adaptive filter 29, the taps 30 of which being identical to the weighting factors 31, 32, 33 in FIG. 4.

Figure 6:
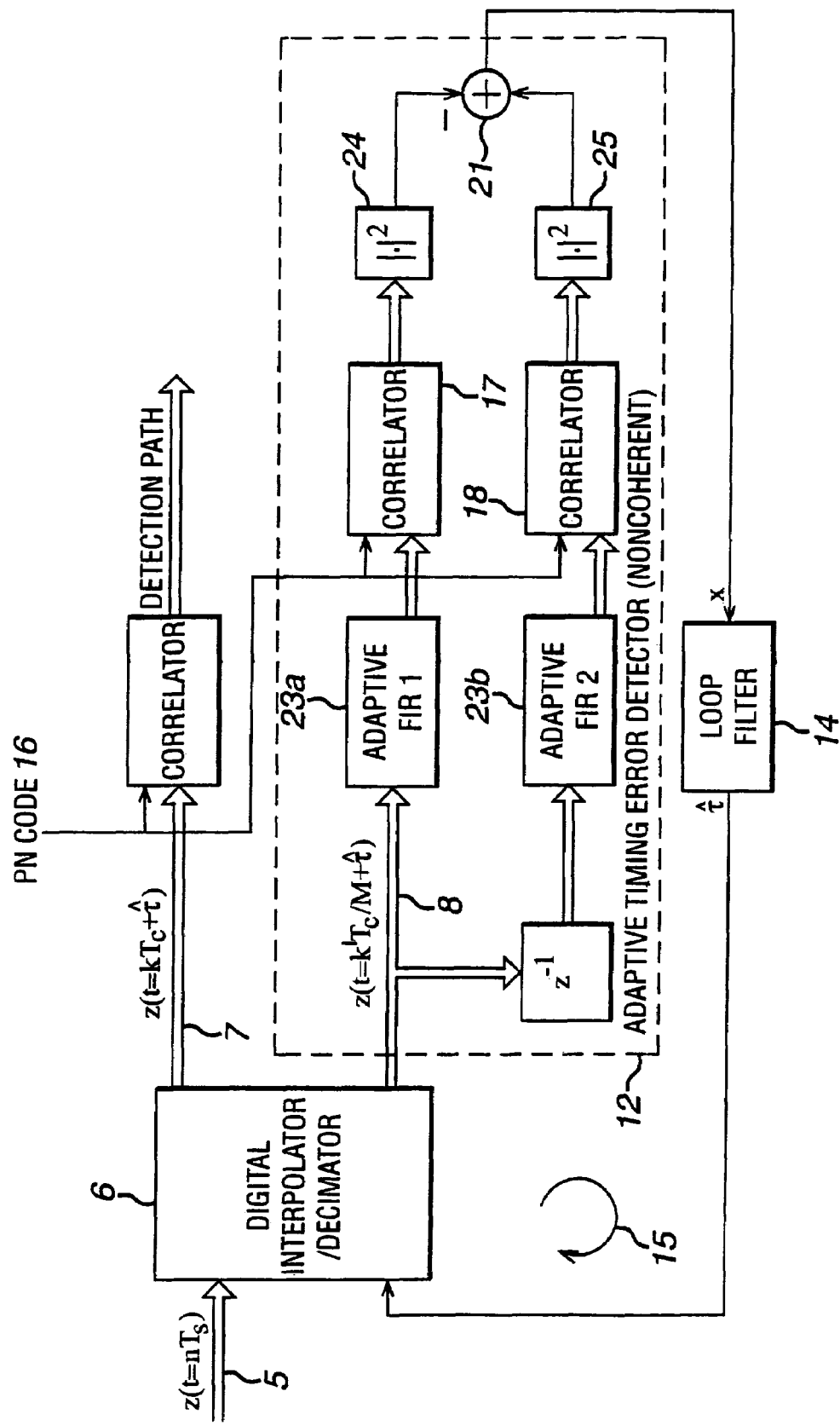
FIG. 6 shows a noncoherent implementation of the new adaptive early-late gate timing error detector, using two adaptive FIR filters and two correlators.

For the noncoherent timing error detector 12, an equivalent model is depicted in FIG. 6. The transition from a bank of adaptively weighted correlators to a single correlator branch cannot be done here due to the nonlinear nature of the absolute-square operation in squaring elements 24, 25.

However, an extension of the conventional non-coherent timing error detector is to also include adaptive FIR filters 29a, 29b in both early and late correlator 17, 18 branches and to jointly optimize their weights so as to minimize multipath interference.

Adaptive FIR Filter Design

The aim of adaptively filtering the data samples in the synchronization path 8 of each finger 9, 10, 11 is to minimize effects of other paths of the multipath signal have on the detector characteristic of the path tracked by the respective rake finger 9, 10 or 11 of rake receiver 1.

Figure 7:
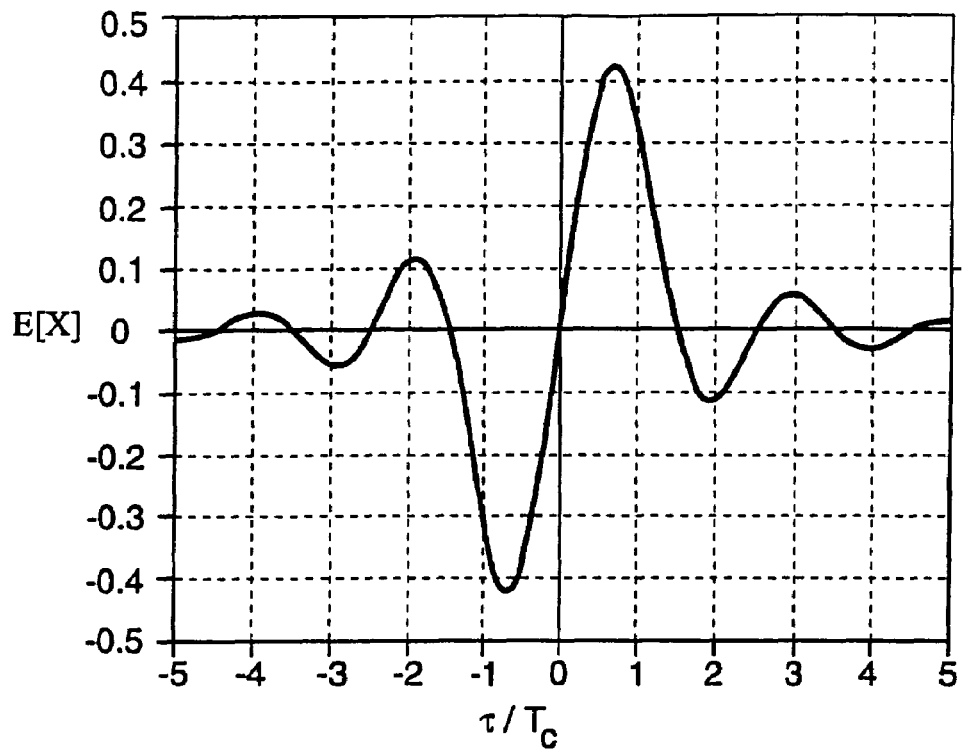
FIG. 7 shows the detector characteristic for a conventional coherent early-late timing error detector.

A typical detector characteristic for the conventional coherent timing error detector, also called S-curve, is depicted in FIG. 7. Let's denote the current path and as such the current rake finger by its index i, then FIG. 7 shows the expected value of the error signal $x_i$, 13 for an AWGN channel, i.e. for a channel including additive white Gaussian noise (AWGN), and a raised-cosine pulse-matched filter autocorrelation function as a function of the $\tau$ in the respective finger 9, 10, 11.

The timing error detector of rake finger i is influenced by adjacent multipaths lying everywhere but in the zero-crossings of the S-curve as for a value of zero no additional contribution arises for this path having a delay resulting in a zero value.

Assuming perfect channel knowledge, meaning a perfect knowledge of path delays $\tau_i$ and powers as well as signal-to-noise ratios, the detector characteristic for each path of the received multipath signal 2 can be designed adaptively by pre-filtering the synchronization path samples, either by generating nulls at the other path locations, or by jointly minimizing an adequate cost function.

In the first case, an additional path j with a delay relative to the current path i which coincides with a zero-crossing of the S-curve of path i does not contribute to the error signal (x, 13) of the actual rake finger with path i being associated to the respective actual rake finger 9, 10 or 11.

For the new adaptive timing error detector, one possibility of computing filter coefficients is to perform a constrained linear optimization, where the constraints are given by the zero-crossing of the S-curve at $\tau=0$, in order to keep the tracker unbiased, and by the normalization of the slope of the S-curve in the origin to some constant.

The task solved by the timing error detector control 34 shown in FIG. 1 is then to find the finite impulse response (FIR) of filter 29 $\lambda=[\lambda_1 \ldots \lambda_L]$ which jointly minimizes the sum of the mean-square of the detector characteristic of the current path at the locations of all other paths and the estimator variance induced by the channel AWGN, being proportional to the filter energy (in the case of an AWGN channel and M=1). The calculated result depends on the length of the FIR filter, L, on the amount and location of the other paths and on the Doppler frequency spread.

Another possibility, with reduced complexity compared to the first inventive embodiment, comprises to extend the conventional timing error detector by one weighted correlator e.g. as shown in FIG. 4 by numerals 28, 33 (or FIR filter taps) so as to "shift" the first zero-crossing left or right of the origin of the S-curve in FIG. 7 to a desired location where the influence of the contribution of the error signal 13 of other paths is reduced. With this last mentioned algorithm one adjacent path of the multipath signal 2 can be considered in the optimization process, resulting in a loss in performance compared to the first scheme at significantly reduced implementation complexity.

The magnitude of the additional correlator is a function of the desired zero-crossing; it can be stored in memory and accessed online, depending on the location of the closest (or strongest) adjacent path.

Between these two inventive embodiments, a tradeoff between performance and complexity is possible.

Description of Further Preferred Embodiments

A further preferred inventive embodiment comprises advanced timing tracking algorithms and methods for an UMTS rake Receiver. It can be shown that conventional tracking algorithms for the channel tap delays in a multipath channel environment, in the form of early-late gate delay-locked loops (EL-DLL), are error-prone in the case that adjacent paths are less than about 1.5. $T_c$ apart, $T_c$ being the chip duration. In that case, the timing estimates of rake fingers assigned by a central control unit tend to merge, resulting in a loss of lock of both fingers. It can also be shown that significant performance gains can be expected if the "path resolution" can be increased. This is due to the fact that the signal energy dispersed on the multipath channel can be gathered more efficiently by the rake receiver.

By adaptively pre-filtering the signal in the synchronization path of the timing error detector (TED), the expected value of the error signal (S-curve) of the timing error detector of each path can be shaped so as to minimize interference of adjacent paths, according to some optimization criterion. Different optimization methods allow a tradeoff between performance and implementation complexity.

Detailed Theoretical Approach In View Of Preferred Embodiments

A rake receiver for CDMA communications in the downlink must be able to accurately acquire and then track the multipath channel parameters for the desired user during the entire duration of the transmission.

The timing tracking algorithms are particularly sensitive to a sufficiently large multipath separation, because if that is not guaranteed, delay estimates in the rake receiver belonging to paths lying "close" together in the delay domain will interfere with one another, causing the estimates to merge. This means a loss-of-lock for both rake fingers, making a reacquisition necessary. Minimum path separations were determined to be about 1.5 $T_c$ for the coherent, data-aided and decision and phasor directed early-late timing error detector, and about 1.75 $T_c$ for the noncoherent, non-data-aided early-late timing error detector.

However, these limitations are of a severely reduced influence for the inventive systems.

Especially in indoor scenarios however, showing a low delay-spread, the assignment and subsequent tracking of rake fingers lying closer together than the mentioned thresholds has shown to yield significant performance gains, i.e. about 5 dB for an indoor scenario with a delay spread of about 2 $T_c$ and a spreading factor SF of 4.

If the acquisition and control unit (path searcher) is thus able to assign rake fingers to paths which lie close together, an adequate tracking scheme which prevents fast loss-of-lock is provided by the invention.

Transmission Model and Timing Error Characteristic Signal Model

The baseband-equivalent transmitted CDMA signal for one user can be expressed as:

$$s(t) = \sum_{k=-\infty}^{\infty} a_{\left[\frac{k}{N_c}\right]} d_{k \bmod N_s} g_T(t - kT_C) \quad (1)$$

with:

$a_n$: data symbol sent at a time instant n $N_c$: spreading factor $N_s$: effective spreading sequence length $d = [d_0 \ldots d_{N_s-1}]$: effective spreading sequence  (2)

$g_T(t)$: root-raised cosine TX pulse $T_c$: chip duration, for UTRA, $T_c$=244.14 ns The multipath fading channel is given by:

$$h(t; \tau) = \sum_{l=0}^{N_p-1} c_l(t)\delta(\tau - \tau_l(t)) \quad (3)$$

with $\tau$ being the relative path delay and t the absolute time variable, respectively.

The discrete-time model for the rake receiver is depicted in FIGS. 16. The received signal is given by:

$$r(t) = s(t) * h(t; \tau) + n(t)$$

where * denotes convolution and n(t) includes additive white Gaussian noise (AWGN) and other-user interference. The signal is pulse-matched filtered and fed to several rake fingers 9, 10, 11, ideally one for each resolvable path of the received multipath signal 2. In each finger 9, 10, 11, the estimated path delay $\hat{\tau}_l$ is compensated for, followed by multiplication with the spreading sequence 16 and summation over one symbol period. Finally, the decorrelated signals from each finger 9, 10, 11 are input to the rake combiner or summation unit 37, which maximizes the signal to noise ratio (SNR) at the output by multiplying the signals with the optimal combiner coefficients, being the complex conjugate of the estimated instantaneous channel phasors, normalized to the overall channel energy.

Timing Error Detectors

The pulse matched-filtered signal z(t) is sampled at twice the chiprate and input to a digital interpolator 6, whose task is to compensate for the estimated timing offset $\hat{\tau}$. At its output, the data is demultiplexed: the "even" samples are fed to the detection path 7, whereas the "odd" samples are input to the tracking path 8—we get two data streams at 1/$T_c$. In the tracking path 8, the data and a shifted version of thereof are decorrelated with the spreading sequence 16. In the noncoherent version, the data samples (now on symbol rate 1/T), are absolute-squared and subtracted, yielding the error signal 13. In the coherent version, the samples are subtracted prior to correlation, correlated and multiplied with complex conjugate maximum-likelihood symbol estimates, created by multiplying symbol decisions or pilot symbols with channel phasor estimates. The real part of the resulting signal yields the error signal 13. In either case, the error signal is fed through a loop filter 14 with lowpass characteristic to yield the timing estimate.

Timing Error Detector Error Characteristic

The expected value of the error signal x, 13 for the coherent timing error detector, also called S-Curve, is depicted in FIG. 7 for an AWGN channel and a raised-cosine pulse-matched filter autocorrelation function. The S-Curve is an open-loop characteristic, meaning that feedback effects are not accounted for. The normal point of operation is when the estimated delay $\tau$ lies around the origin. A small deviation from zero will generate an error signal which is used in the feedback loop to drive the delay error back to zero. If the channel is nondispersive, meaning that there is only one propagation path, then the error signal is a function of that one path only.

However, if one or several other paths exist in the channel model, then they will contribute to the error signal, increasing the noise level by a factor proportional to their tap power and to the square of the value of the S-Curve at their location. If the S-Curve is equal to zero at those locations, then those additional paths will have no influence on the error signal on average. The basic idea of minimizing the influence of adjacent paths is thus to "reshape" the characteristic such that is has zero-crossings at the locations of adjacent paths. This can be achieved by pre-filtering the signal in the synchronization path 8 and it will be further outlined in the following discussion.

Interference Minimization By Adaptive Pre-Filtering and Structure of the New Timing Error Detector The concept of the new adaptive timing error detector is depicted in FIG. 4 for the coherent case. Instead of using one early and one late correlator, several early and late correlators are employed. The digital interpolator/decimator 6 again feeds the correct samples at rate $1/T_c$, to the detection path. The synchronization path is fed with samples at rate $M/T_c$. The shifted versions thereof in the following correlator branches may be aligned symmetrically in an early-late fashion with respect to the detection path 7, as in the conventional case, or alternatively shifted in the causal or noncausal direction. In either case the samples in each branch are correlated with the PN-code 16 and adaptively weighted such as to minimize the effect of other multipaths tracked in the rake receiver.

For the coherent timing error detector, the adaptive weighting of several correlation branches corresponds to the adaptive finite impulse response (FIR) filtering model in FIG. 5. Due to the linearity of the correlation operation, the weighting and summation can be performed prior to correlating with the PN-code 16, yielding a much simplified structure with only one correlator 26 and one adaptive filter 29, the taps of which being identical to the weighting factors 31, 32, 33 in FIG. 4. For the noncoherent timing error detector, an equivalent model is depicted in FIG. 6. The transition from a bank of adaptively weighted correlators to a single FIR/correlator branch cannot be done here due to the nonlinear nature of the absolute-square operation. However, a natural extension of the conventional non-coherent timing error detector is to also include adaptive FIR filters in both early and late correlator branches and to jointly optimize their weights so as to minimize multipath interference.

Adaptive Filter Design

The design of the adaptive FIR filters offers a tradeoff between performance in terms of lock-in-behavior and complexity. Under the assumption of perfect channel knowledge, meaning path delays and powers as well as signal-to-noise ratios, the detector characteristic for each path can be designed adaptively by pre-filtering the synchronization path samples, either by generating nulls at the other path locations, or by jointly minimizing an adequate cost function.

Constrained Linear Optimization

For the new adaptive timing error detector, one possibility of computing filter coefficients is to perform a constrained linear optimization, where the constraints are given by the zero-crossing of the S-curve at $\tau=0$, in order to keep the tracker unbiased, and by the normalization of the slope of the S-curve in the origin to some constant. The task is then to find the FIR filter 29 $\lambda=[\lambda_1 \ldots \lambda_L]$, which jointly minimizes the sum of the mean-square of the detector characteristic of the current path at the locations of all other paths and the estimator variance induced by the channel AWGN, being proportional to the filter energy (in the case of an AWGN channel and M=1). The result depends on the length of the FIR filter 29, L, on the amount and location of the paths and on the Doppler frequency spread. For general references on linear optimization, see e.g. D. G. Luenberger, "Optimization by vector-space methods", John Wiley and Sons, 1969 and R. Fletcher, "Practical methods of optimization", John Wiley and Sons, 1987. Define a cost function $V(\lambda)$ to be:

$$V(\lambda)=\|A\lambda\|^2+\|\lambda\|^2=\lambda^T(A^TA+I) \quad (5)$$

where the matrix A is (Np×L) and contains the mean-square contribution of each path at each FIR filter tap location:

$$A = \begin{pmatrix} A_{1,1} & \cdots & A_{1,L} \\ \vdots & \ddots & \vdots \\ A_{Np,1} & \cdots & A_{Np,L} \end{pmatrix} \quad (6)$$

$$A_{ij} = c_i \cdot \gamma \cdot g(\tau_i - \delta_j).$$

$c_i$ is the root-mean square (rms) power of path i, normalized to the total power, $\gamma$ is the overall rms signal to noise ratio (SNR) and $\delta_j$ is the j-th filter tap location, relative to the detection path sample. For the example in FIG. 10, $\delta=[-1.5, -0.5, 0.5, 1.5]$. $\tau$ and $\delta$ are normalized to the chip duration.

Due to the fact that the chips are essentially uncorrelated after descrambling, $\|\lambda\|^2=\Sigma^L_{i=1}\lambda_i^2$. I is the (L×L) identity matrix. The aim is now to minimize cost function $V(\lambda)$, subject to the constraints mentioned above:

$$\min_\lambda\{V(\lambda): D\lambda = f\} = \min_{\lambda \subset F} V(\lambda) \quad (7)$$

$$F = D^+f + N[D]$$

The matrix D is (2×L) and contains the expression for the zero crossing of the timing error detector characteristic $\tau=0$ and its slope at the same location:

$$D = \begin{pmatrix} D_{1,1} & \cdots & D_{1,L} \\ D_{2,1} & \cdots & A_{2,L} \end{pmatrix}$$

$$D_{i,j} = g(t = \delta_j) \quad (8)$$

$$D_{2,j} = \frac{\partial}{\partial t} g(t) \Big|_{t=\delta_j} \quad (9)$$

g(t) is the pulse-matched filter autocorrelation function, f=[0 c]$^T$ describes the two conditions, c being the constant slope at the origin. D+ is the pseudoinverse of D and N[D] is its nullspace. The idea is now to move from a constrained optimization to an unconstrained one. To that end, the first step is to reduce the dimensionality of the problem. A singular value decomposition of D yields:

$$D = PSQ^T, \quad (10)$$

where P is ($N_p \times N_p$) and Q is (L×L). S is of the form:

$$S = \begin{pmatrix} \hat{D} & \cdots & 0 \\ \vdots & \ddots & \vdots \\ 0 & \cdots & 0 \end{pmatrix} \quad (11)$$

where $\hat{D}$ is (v×v), and diagonal (v≦min(Np, L)). The nullspace of D is equal to the range of a matrix H, being defined as:

$$H = [q_{v+1} \ldots q_n] \quad (12)$$

with the $q_i$ being the indexed columns of Q. This identity yields the new unconstrained optimization problem:

$$\min_{\theta \in R^{n-v}} V(D^+ f + H\theta) \quad (13)$$

Inserting λ=D$^+$ f+Hθ into (5) yields:

$$V(\lambda) = (D^+ f + H\theta)^T (A^T A + I)(D^+ f + H\theta) \quad (14)$$
$$= \|D^+ f\|^2 + 2f^T (D^+)^T (A^T A + I) H\theta + \theta^T H^T (A^T A + I) H\theta$$
$$= \|D^+ f\|^2 + B^T \theta + \frac{1}{2} \theta^T C\theta$$

This is a quadratic form in θ. Solving for θ finally yields:

$$\theta = -C^+ B \quad (15)$$

with:

$$B = (2f^T (D^+)^T (A^T A + I) H)^T$$
$$C = 2H^T (A^T A + I) H$$

Figure 8:
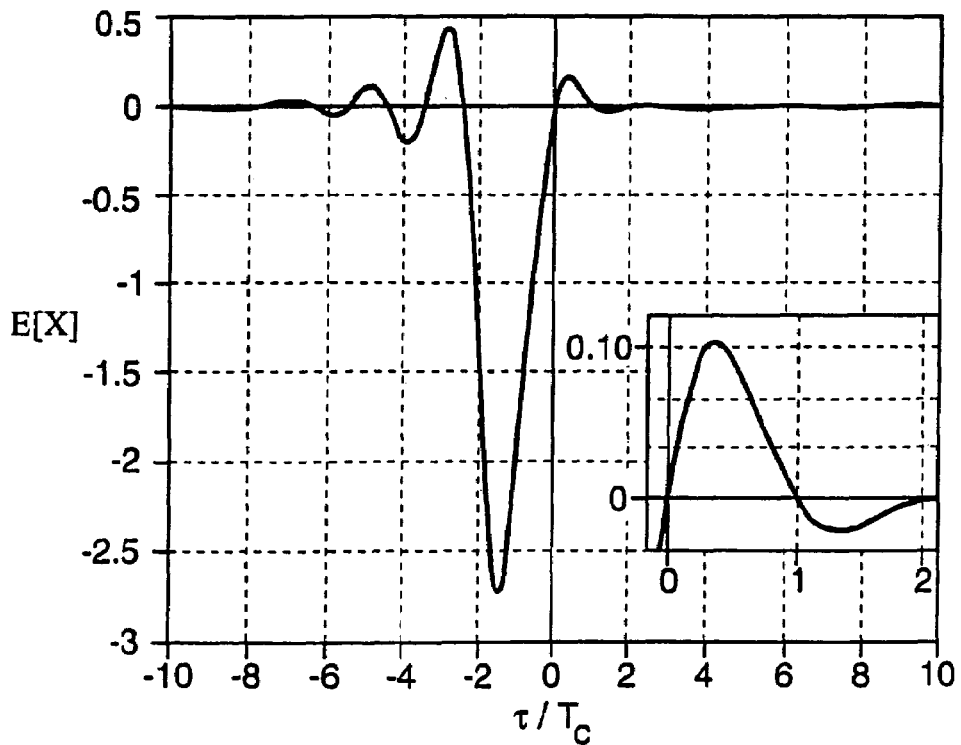
FIG. 8 shows one possible detector characteristic for the new modified adaptive early-late timing error detector in its coherent version.

The FIR filter λ is then given by λ=D$^+$f+Hθ. An example for a resulting S-curve in this case is shown in FIG. 8. Here, 3 paths have been assumed at relative delays of $\tau_1$=0, $\tau_2$=$T_c$ and $\tau_3$=2$T_c$, with root mean-square powers of 0 dB, −10 dB and −20 dB, respectively.

It is easily seen that the contributions of the two paths adjacent to the one at the origin are nulled out by the zero-crossings of the S-curve at their respective locations. It is seen in the magnified region that the detector characteristic for path 1 is nearly zero at the location of the two other paths. It is also noted that the lock-in range of the delay tracking loop, being the region from τ=0 to the first zero-crossing in either direction, is physically constrained by pre-filtering the synchronization path samples.

Reduced Complexity Optimization

A sub-optimal method, however, with significantly reduced complexity compared to the first embodiment is to extend the conventional timing error detector by one or two weighted correlators (or FIR filter taps) so as to "shift" the first zero-crossing left or right of the origin of the S-curve in FIG. 7 to a desired location. With this algorithm, one adjacent path can be considered in the optimization process, resulting in a loss in performance compared to the first scheme at significantly reduced implementation complexity. The magnitude of the additional correlator is a function of the desired zero-crossing; it can be stored in memory and accessed online, depending on the location of the closest (or strongest) adjacent path.

Consider the case where the early-late structure is extended by two correlators lying±1.5 $T_c$ from the detection sample, i.e. an extension with M=1, L=4 according to FIG. 4. The "outer" taps of the adaptive FIR are assumed to be equal in magnitude, but with opposing sign. The inner taps are assumed to be ±1, as in the conventional timing error detector structure. With this structure, a zero-forcing condition for the timing error detector characteristic at some location T can be derived in a straightforward manner. The expected value of the error signal x is given by:

$$E[x] = g(T_c/2+\tau) - g(-T_c/2+\tau) + \lambda\{g(-3T_c/2+\tau) - g(3T_c/2+\tau)\} \quad (16)$$

where g(t) is assumed to be the pulse-matched filter autocorrelation function in the AWGN case. Setting to zero and solving for X yields (for the AWGN case):

$$\lambda(\tau) = \frac{g(-T_c/2 + \tau) - g(T_c/2 + \tau)}{g(-3T_c/2 + \tau) - g(3T_c/2 + \tau)} \quad (17)$$

Figure 9:
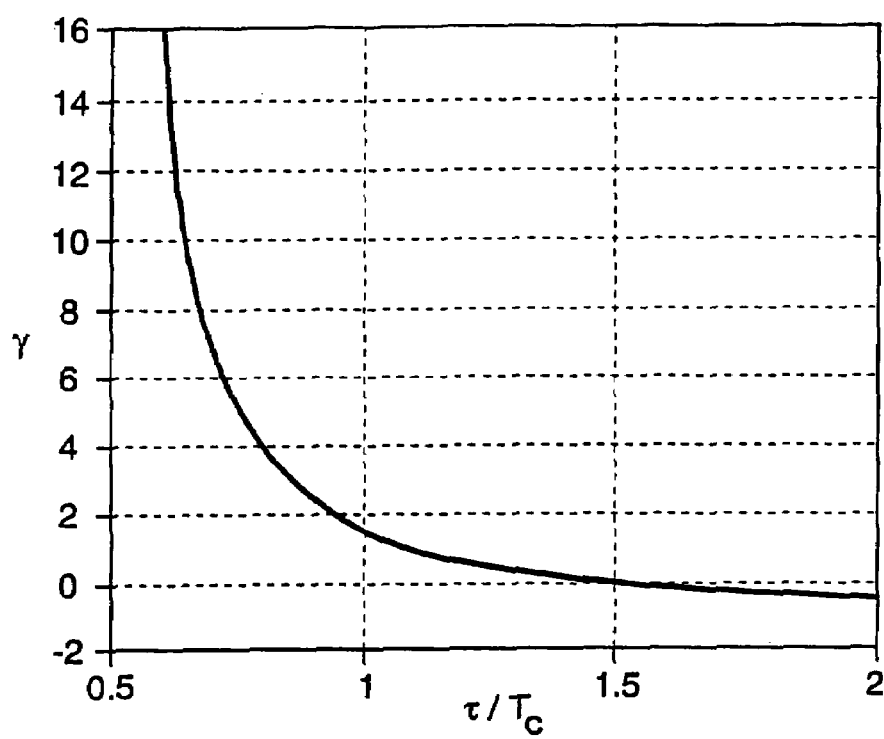
FIG. 9 shows a two dimensional plot of the characteristics of outer finite impulse response filter taps.
Figure 10:
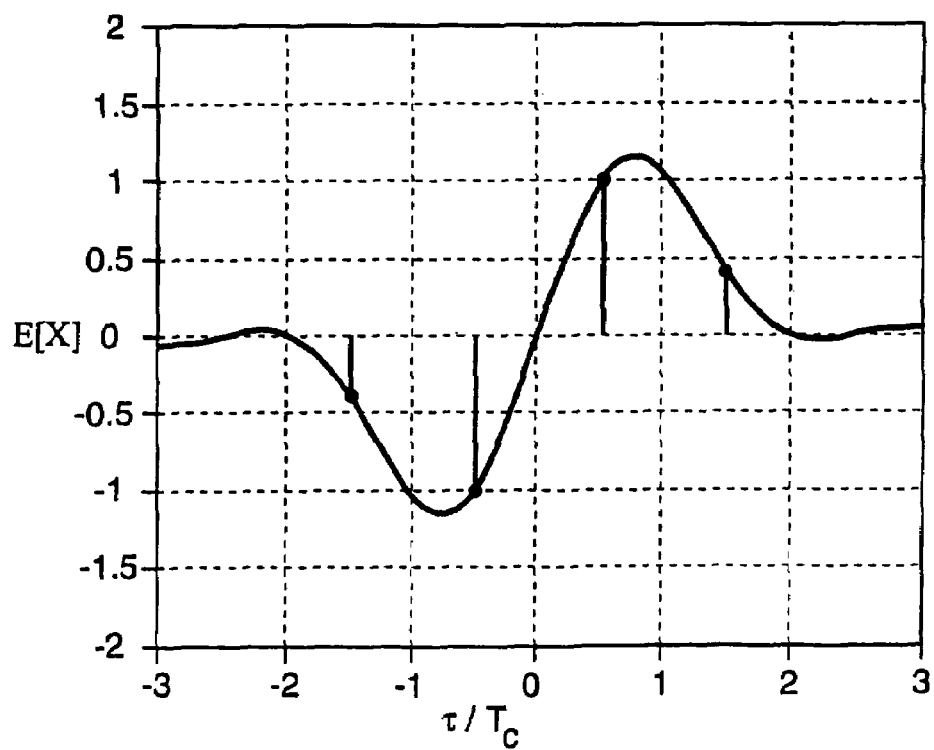
FIG. 10 shows an error signal S-curve for EL extension with a zero-crossing at $\tau=\pm 2T_c$.
Figure 11:
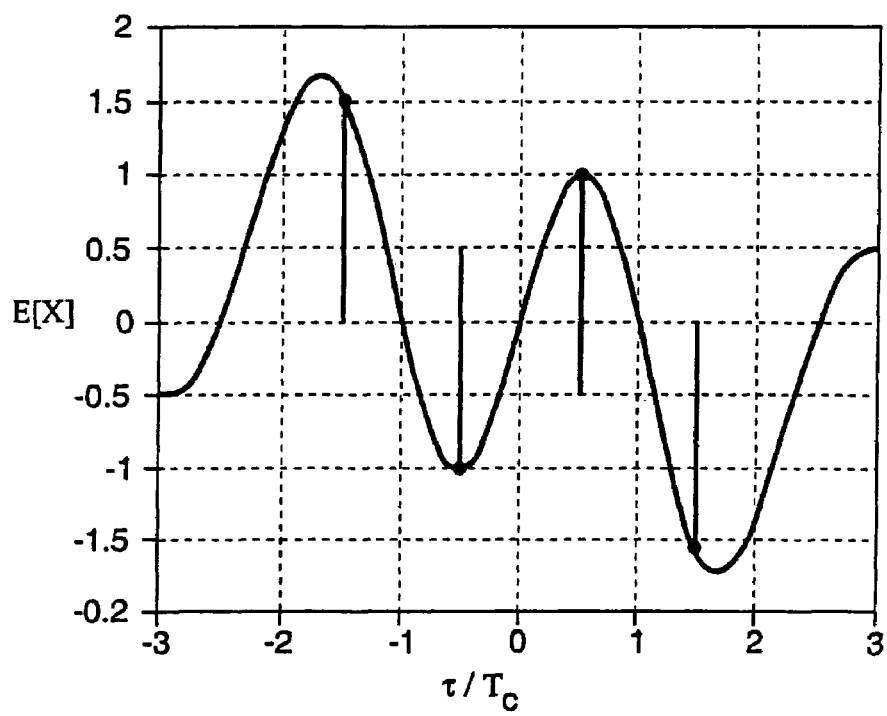
FIG. 11 shows an error signal S-curve for EL extension with a zero-crossing at $\tau=\pm T_c$.

Once the exact structure of the timing error detector is known (M, L), this characteristic depends only on the desired location of the zero crossing. It is shown in FIG. 9 for the structure mentioned above. S-curves for optimized timing error detectors are shown in FIGS. 10 and 11, where adjacent paths are assumed to be 2 $T_c$ and $T_c$ away, respectively. The taps indicate the placement and size of the EL-FIR filter taps with respect to the detection path sample.

Tracking Performance

Figure 12:
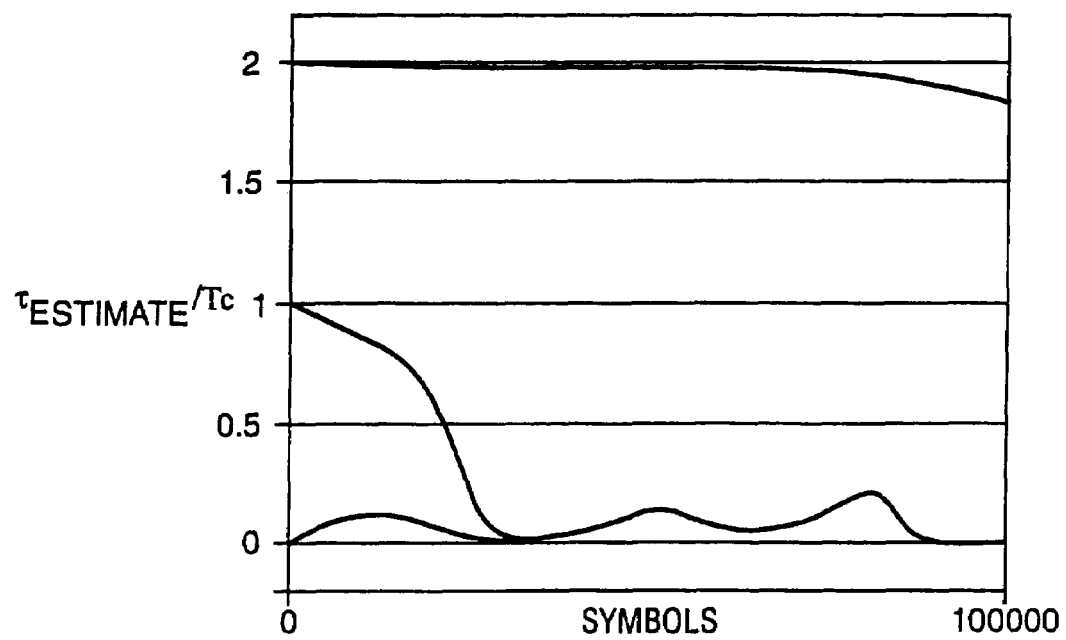
FIG. 12 shows timing tracking estimates for a conventional timing error detector based on an indoor scenario with a spreading factor SF=4, moving speed of receiver 10 km/h and a chip duration $T_c=1$ sec/$3.84*10^6$.
Figure 13:
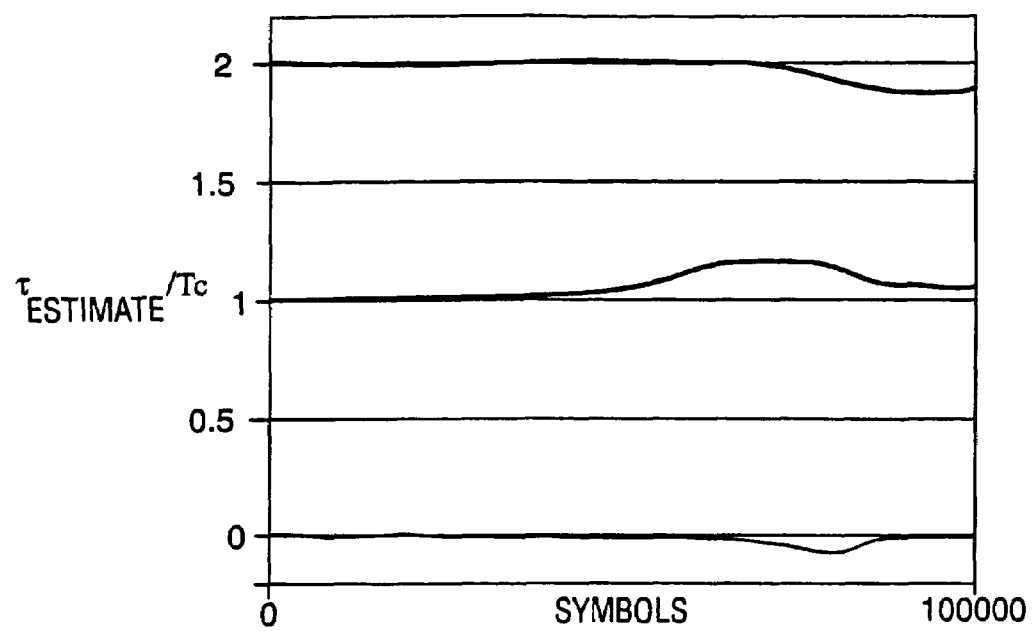
FIG. 13 shows timing tracking estimates for an inventive simple adaptive timing error detector based on an indoor scenario with values SF=4 and a moving receiver having a speed of about 10 km/h and a chip duration $T_c=1$ sec/$3.84*10^6$.
Figure 14:
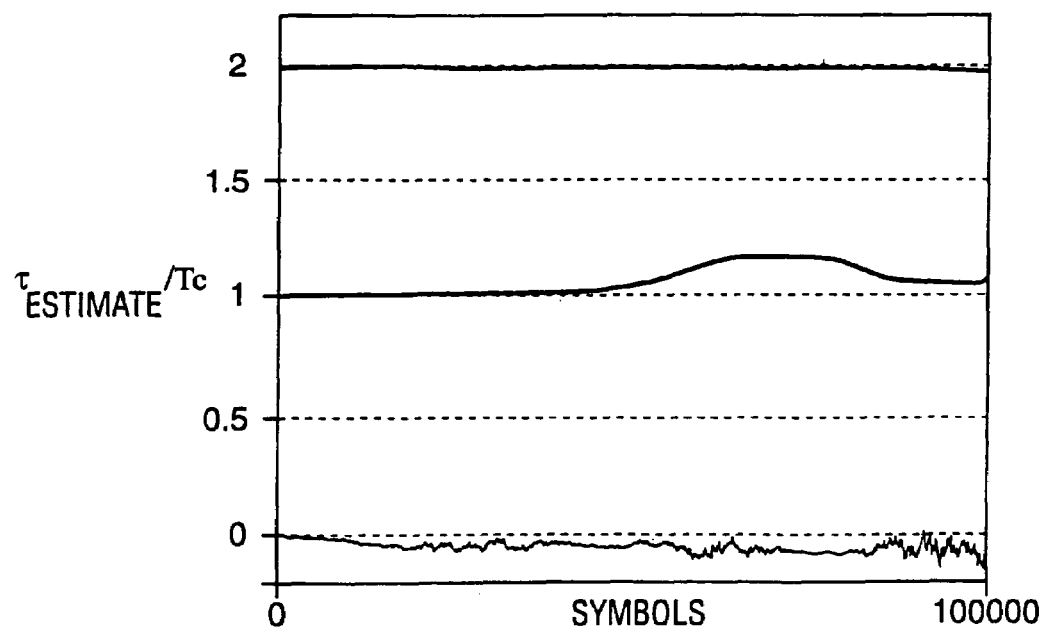
FIG. 14 shows timing tracking estimates for an inventive MMSE adaptive timing error detector based on an indoor scenario with values SF=4 and a moving receiver having a speed of about 10 km/h and a chip duration $T_c=1$ sec/$3.84*10^6$.

Simulated path delay estimates for an indoor channel model, SF=4 and a mobile speed of 10 km/h are shown in FIGS. 12, 13 and 14 for the conventional timing error detector, an adaptive timing error detector with reduced complexity early late extension (EL extension) and the above-explained minimum mean squared error (MMSE) adaptive timing error detector, designed using the constrained linear optimization and as expressed e.g. in equation 7, respectively.

It is seen that with the conventional timing error detector, the first two paths merge fairly quickly and both rake fingers subsequently track the same resulting path. The simple early-late extension is already able to prevent a loss-of-lock of any finger, only low-rate fading is seen to influence the path delay estimates. For the MMSE adaptive timing error detector, it is seen that the tracking jitter increases for the first path, a consequence of two facts: on one hand, the path itself is strong compared to the other two, resulting in a large error signal, on the other hand, due to the large resulting filter taps and as such an increased filter energy, the loop noise is further enhanced for this case.

Figure 15:
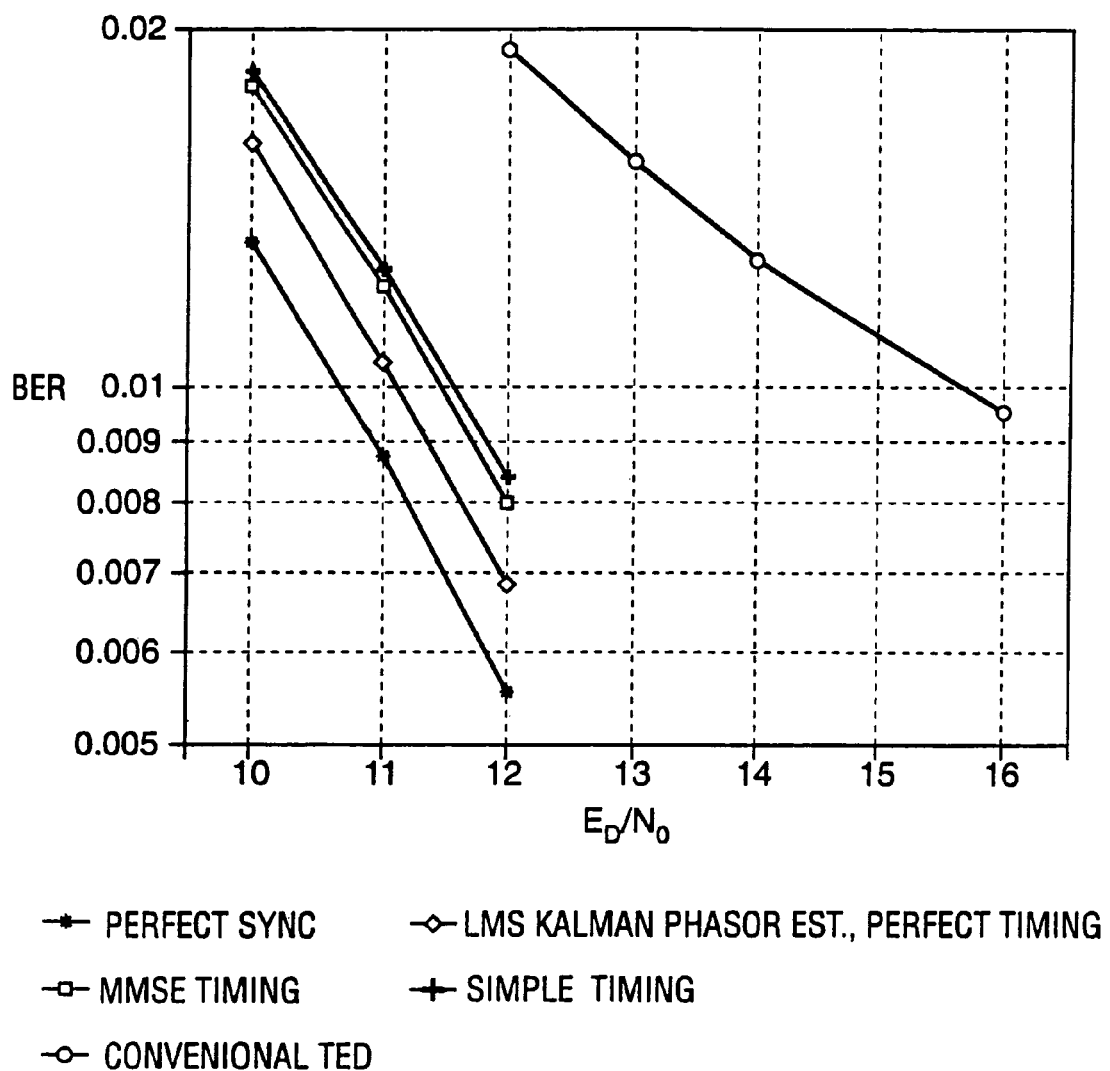
FIG. 15 shows a two dimensional plot of tracking performance values for different timing error detectors.

The improved tracking behavior for narrowly spaced rake fingers directly translates into a significant performance gain, reflected in FIG. 15. It is seen that the inventive receiver gains at least about 4 dB compared to the conventional timing error detector and that the simple and the MMSE optimization perform nearly equally well. An exemplary detection loss with respect to the case with perfect channel estimation (the leftmost curve), resulting from phasor and timing tracking, amounts to 0.8 dB in this particular scenario, equally distributed among the LMS Kalman phasor estimation used here and the adaptive timing tracking.

In general, a significant performance improvement results if the detector characteristics for all rake fingers are adaptively modified according to the inventive concepts.

Using the knowledge of instantaneous multipath delays, powers and SNR (or estimates thereof), filters can be designed for each rake finger which minimize multipath interference as described above. On one hand, more rake fingers can be assigned within a small delay range, because a loss-of-lock will be much less likely due to less or no interference from other paths.

On the other hand, and as a consequence of the first fact, the effective SNR at the output of the rake receiver will be improved significantly, because more signal energy can be gathered by the rake receiver. Equivalently, the signal to noise ratio (SNR) requirement in order to achieve a certain bit error rate (BER) will be reduced, especially in indoor or pedestrian scenarios. The necessary computations can be performed at significantly lower processing rates than the chiprate, due to the fact that channel delay dynamics are usually very slow.

Also, the computation of the adaptive filter coefficients in the case of constrained linear optimization can be divided in one part depending solely on the structure of the timing error detector, i.e. the oversampling factor M and the filter length L, and one part depending on the actual instantaneous channel. The former can be computed offline once the structure is known, whereas the latter should be computed in an online fashion.

A tradeoff between computation complexity and adaptivity or adapting ability is possible if e.g. the filter length is kept variable. Also, in contrast to existing solutions, no estimates of instantaneous channel multipath amplitudes and phases are required according to the invention.

The invention claimed is:

1. A rake receiver for a spread-spectrum (SS) signal, the rake receiver comprising:
    sampling circuitry adapted to generate a stream of samples corresponding to the SS signal;
    a plurality of rake fingers, wherein each rake finger corresponds to a different multipath component of the SS signal and a first rake finger corresponding to a first multipath component comprises:
        a detection path adapted to detect symbols based on the stream of samples; and
        a synchronization (synch) path adapted to control timing of the sampling circuitry, wherein the synch path comprises:
            front-end synch circuitry adapted to apply three or more time delays, weighting, and SS correlation to the stream of samples to generate front-end output signals; and
            back-end synch circuitry adapted to generate one or more control signals for controlling the timing of the sampling circuitry based on the front-end output signals; and
    a weighting controller adapted to adaptively control the weighting applied by the front-end synch circuitry to minimize effects of one or more other multipath components associated with one or more other rake fingers of the rake receiver.

2. The invention of claim 1, wherein the weighting controller is adapted to adaptively control the weighting to minimize the effects of the one or more other multipath components by reshaping a detector characteristic for the first rake finger to have a zero-crossing substantially corresponding to a time delay associated with each other rake finger.

3. The invention of claim 1, wherein the weighting controller is adapted to adaptively control the weighting to minimize the effects of the one or more other multipath components by minimizing a cost function that is a function of a mean-square of the detector characteristic at the time delay associated with each other rake finger.

4. The invention of claim 1, wherein the sampling circuitry comprises:
    an analog-to-digital (A/D) converter adapted to generate a digitized signal from an analog signal corresponding to the spread spectrum signal; and
    an interpolator/decimator adapted to generate the stream of samples from the digitized signal, wherein the synch path is adapted to control the timing of at least one of the A/D converter and the interpolator/decimator.

5. The invention of claim 1, wherein:
    the front-end synch circuitry comprises at least three differently delayed paths, each differently delayed path
        (i) having a differently delayed version of the stream of samples and (ii) comprising:
            a correlator adapted to apply SS correlation to the corresponding delayed version based on a spreading code associated with the SS signal; and
            a weighting element adapted to apply a corresponding weighting factor to the corresponding delayed version, wherein each differently delayed path generates a different front-end output signal; and
    the back-end circuitry comprises:
        a summation node adapted to sum the at least three front-end output signals from the at least three differently delayed paths;
        a multiplier adapted to multiply an output from the summation node by a stream of reconstructed transmitted symbols; and
        a filter adapted to filter an output from the multiplier to generate the one or more control signals.

6. The invention of claim 1, wherein the front-end synch circuitry comprises:
    a first adaptive filter having at least three taps and adapted to perform at least part of the time delaying and weighting, wherein the weighting controller is adapted to adaptively control at least three tap coefficients to minimize the effects of the one or more other multipath components associated with the one or more other rake fingers of the rake receiver; and
    a first correlator adapted to apply SS correlation to an output from the first adaptive filter.

7. The invention of claim 6, wherein the first adaptive filter is an adaptive finite impulse response (FIR) filter.

8. The invention of claim 6, wherein the back-end circuitry comprises:
a multiplier adapted to multiply an output from the front-end synch circuitry by a stream of reconstructed transmitted symbols; and
a filter adapted to filter an output from the multiplier to generate the one or more control signals.

9. The invention of claim 6, wherein:
the front-end synch circuitry further comprises:
a second adaptive filter having at least three other taps and adapted to perform other time delaying and weighting, wherein the weighting controller is adapted to adaptively control at least three other tap coefficients for the second adaptive filter to minimize the effects of the one or more other multipath components associated with the one or more other rake fingers of the rake receiver; and
a second correlator adapted to apply SS correlation to an output from the second adaptive filter; and
the back-end circuitry comprises:
a first absolute squaring element adapted to generate a square of an absolute value of an output from the first correlator;
a second absolute squaring element adapted to generate a square of an absolute value of an output from the second correlator;
a difference node adapted to subtract outputs from the first and second absolute squaring elements; and
a filter adapted to filter an output from the difference node to generate the one or more control signals.

10. A method for processing a spread-spectrum (SS) signal, the method comprising:
(a) generating a stream of samples corresponding to the SS signal;
for a first multipath component of the SS signal:
(b) detecting symbols based on the stream of samples; and
(c) controlling timing of the sample stream generation by:
(1) applying three or more time delays, weighting, and SS correlation to the stream of samples to generate front-end output signals; and
(2) generating one or more control signals for controlling the timing of the sample stream generation based on the front-end output signals; and
(d) adaptively controlling the weighting to minimize effects of one or more other multipath components associated with the SS signal.

11. The invention of claim 10, wherein step (d) comprises reshaping a detector characteristic corresponding to the first multipath component to have a zero-crossing substantially corresponding to a time delay associated with each other multipath component.

12. The invention of claim 10, wherein step (d) comprises minimizing a cost function that is a function of a mean-square of the detector characteristic at the time delay associated with each other multipath component.

13. The invention of claim 10, wherein step (a) comprises:
digitizing an analog signal corresponding to the spread spectrum signal to generate a digitized signal; and
interpolating/decimating the digitized signal to generate the stream of samples, wherein the one or more control signals control the timing of at least one of the digitizing and the interpolating/decimating.

14. The invention of claim 10, wherein:
step (c)(1) is implemented along at least three differently delayed paths, each differently delayed path (i) having a differently delayed version of the stream of samples and (ii) wherein:
SS correlation is applied to the corresponding delayed version based on a spreading code associated with the SS signal; and
a corresponding weighting factor is applied to the corresponding delayed version, wherein each differently delayed path generates a different front-end output signal; and
step (c)(2) comprises:
summing the at least three front-end output signals from the at least three differently delayed paths;
multiplying an output from the summing by a stream of reconstructed transmitted symbols; and
filtering an output from the multiplying to generate the one or more control signals.

15. The invention of claim 10, wherein step (c)(1) comprises:
applying a first adaptive filter having at least three taps to perform at least part of the time delaying and weighting, wherein step (d) comprises adaptively controlling at least three tap coefficients to minimize the effects of the one or more other multipath components; and
applying first SS correlation to an output from the first adaptive filter.

16. The invention of claim 15, wherein the first adaptive filter is an adaptive FIR filter.

17. The invention of claim 15, wherein step (c)(2) comprises:
multiplying an output from step (c)(1) by a stream of reconstructed transmitted symbols; and
filtering an output from the multiplying to generate the one or more control signals.

18. The invention of claim 15, wherein:
step (c)(1) further comprises:
applying a second adaptive filter having at least three other taps to perform other time delaying and weighting, wherein step (d) comprises adaptively controlling at least three other tap coefficients for the second adaptive filter to minimize the effects of the one or more other multipath components; and
applying second SS correlation to an output from the second adaptive filter; and
step (c)(2) comprises:
generating a first square of an absolute value of an output from the first SS correlation;
generating a second square of an absolute value of an output from the second SS correlation;
subtracting the first and second squares; and
filtering an output from the subtracting to generate the control signals.

19. An apparatus for processing a spread-spectrum (SS) signal, the apparatus comprising:
(a) means for generating a stream of samples corresponding to the SS signal;

for a first multipath component of the SS signal:
- (b) means for detecting symbols based on the stream of samples; and
- (c) means for controlling timing of the sample stream generation by:
  - (1) applying three or more time delays, weighting, and SS correlation to the stream of samples to generate front-end output signals; and
  - (2) generating one or more control signals for controlling the timing of the sample stream generation based on the front-end output signals; and
- (d) means for adaptively controlling the weighting to minimize effects of one or more other multipath components associated with the SS signal.

* * * * *